United States Patent
Stewart

(10) Patent No.: US 11,833,954 B1
(45) Date of Patent: Dec. 5, 2023

(54) BOAT BOW ROCK GUARD FOR BOAT TRAILER

(71) Applicant: Battery Doctors & Mild 2 Wild Motorsports, Mandan, ND (US)

(72) Inventor: Jake Stewart, Mandan, ND (US)

(73) Assignee: Battery Doctors & Mild 2 Wild Motorsports, Mandan, ND (US)

( * ) Notice: Subject to any disclaimer, the term of this patent is extended or adjusted under 35 U.S.C. 154(b) by 644 days.

(21) Appl. No.: 17/077,867

(22) Filed: Oct. 22, 2020

Related U.S. Application Data

(60) Provisional application No. 62/925,339, filed on Oct. 24, 2019.

(51) Int. Cl.
*B60P 3/10* (2006.01)

(52) U.S. Cl.
CPC ......... *B60P 3/1041* (2013.01); *B60P 3/1066* (2013.01)

(58) Field of Classification Search
CPC ............................. B60P 3/1041; B60P 3/1066
See application file for complete search history.

(56) References Cited

U.S. PATENT DOCUMENTS

| | | | | |
|---|---|---|---|---|
| 3,563,594 A * | 2/1971 | London | ................. | B60J 11/025 293/41 |
| 4,732,421 A * | 3/1988 | Ross | ................. | B60J 11/02 296/136.03 |
| 5,899,166 A * | 5/1999 | Alexander | ............. | B63B 59/02 114/361 |
| 6,012,759 A * | 1/2000 | Adamek | ................. | B60J 11/02 296/136.03 |
| 6,092,856 A * | 7/2000 | Ladensack | ............. | B60J 7/1278 296/136.12 |
| 6,616,188 B1 * | 9/2003 | Jefferies | ................... | B60P 3/10 280/847 |
| 7,338,100 B2 * | 3/2008 | Meyer | .................... | B60R 19/44 293/142 |
| 7,828,316 B1 * | 11/2010 | Joseph | ................. | B60P 3/1058 280/414.1 |
| 2020/0108761 A1 * | 4/2020 | Howell | ................. | B60P 3/1041 |

* cited by examiner

*Primary Examiner* — Tony H Winner
(74) *Attorney, Agent, or Firm* — Thorpe North & Western, LLP.

(57) ABSTRACT

A rock guard comprises a flexible sheet of mesh selectively wound around a spool to be selectively retracted and deployed in front of a trailer or its contents, such as a boat. A pair of brackets mount to a rail of trailer and carry the spool. A top distal edge of the sheet can be flexible and arcuate in the deployed configuration to form an arc matching a gunwale of the boat.

20 Claims, 3 Drawing Sheets

BOAT BOW ROCK GUARD FOR BOAT TRAILER

PRIORITY CLAIM

Priority is claims to U.S. Provisional Patent Application Ser. No. 62/925,339, filed Oct. 24, 2019, which is hereby incorporated herein by reference.

BACKGROUND

Boats are often transported on trailers behind vehicles whose tire can kick rocks up off the road and against the bow or the hull of the boat. Some rock guards have been proposed that position panels between the boat and the vehicle. But such panels can interfere with maintenance of the boat. The development of rock guards is an ongoing endeavor.

BRIEF DESCRIPTION OF THE DRAWINGS

Features and advantages of the invention will be apparent from the detailed description which follows, taken in conjunction with the accompanying drawings, which together illustrate, by way of example, features of the invention; and wherein.

Figure 1:
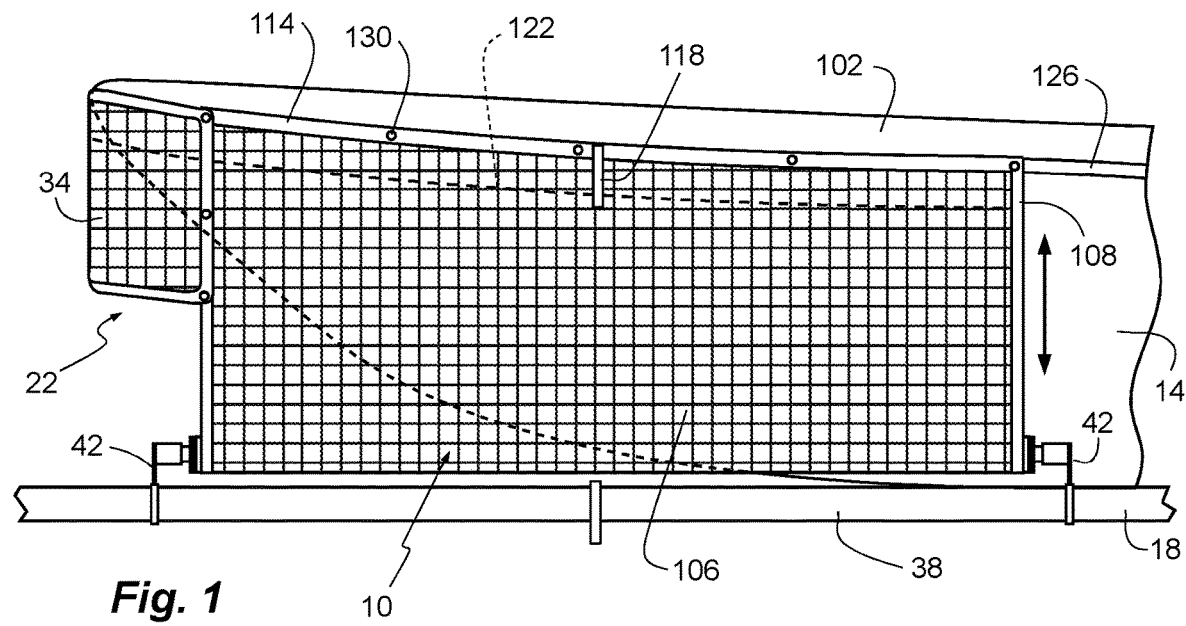
FIG. 1 is a side schematic view of a rock guard system with a rock guard in accordance with an embodiment of the invention shown installed on a boat trailer and boat and shown in a deployed configuration.
Figure 2:
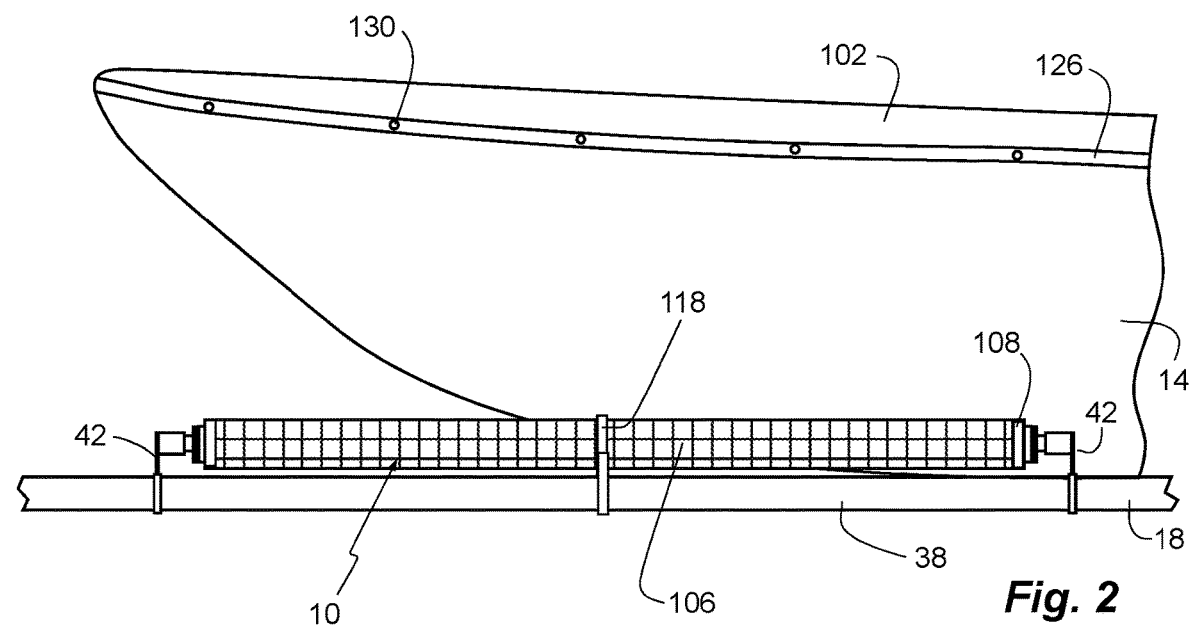
FIG. 2 is a side schematic view of the rock guard of FIG. 1, shown in a retracted configuration.
Figure 3:
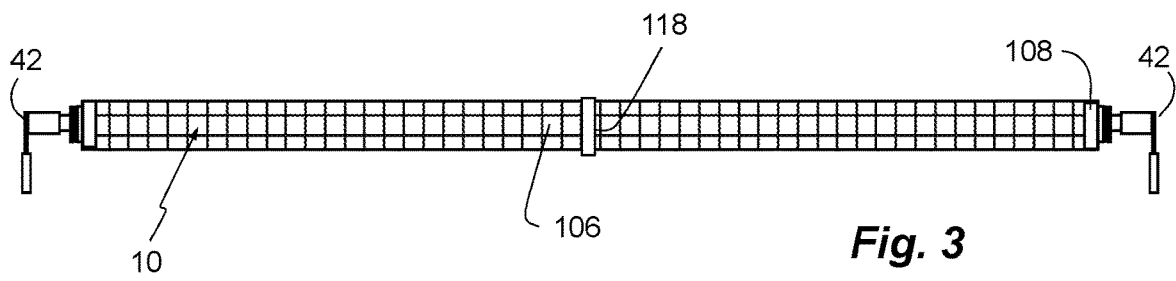
FIG. 3 is a side view of the rock guard of FIG. 1 shown in the retracted configuration.
Figure 4:
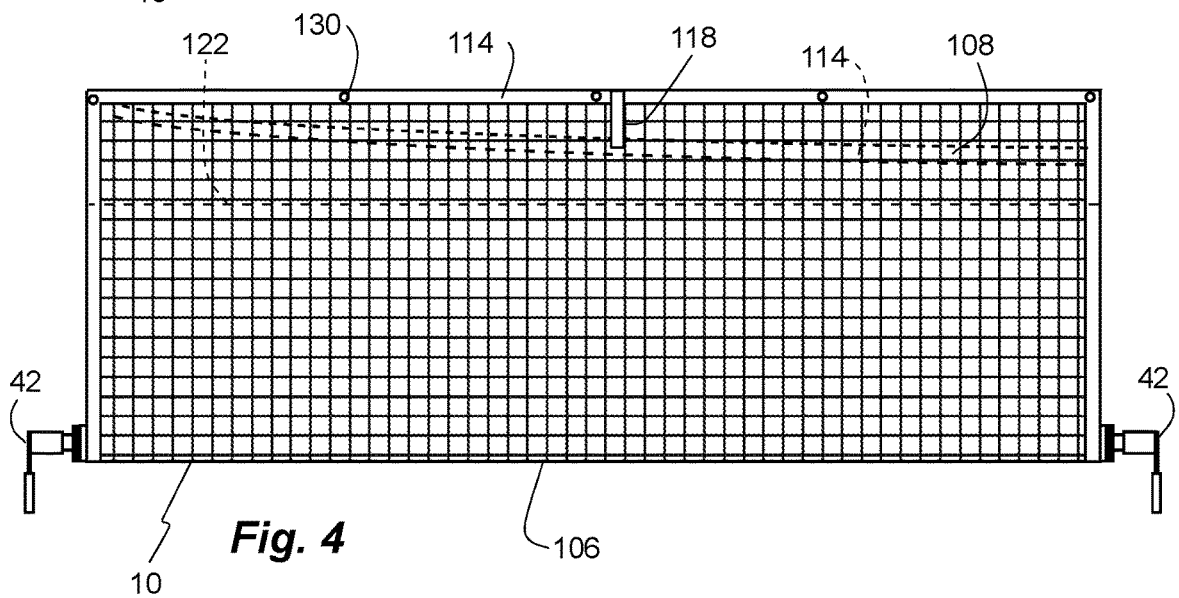
FIG. 4 is a side view of the rock guard of FIG. 1 shown in the deployed configuration.

Reference will now be made to the exemplary embodiments illustrated, and specific language will be used herein to describe the same. It will nevertheless be understood that no limitation of the scope of the invention is thereby intended.

DETAILED DESCRIPTION

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting.

The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

As used herein, a plurality of items, structural elements, compositional elements, and/or materials may be presented in a common list for convenience.

However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, sizes, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Furthermore, the described features, structures, or characteristics may be combined in any suitable manner in one or more embodiments. In this description, numerous specific details are provided, such as examples of layouts, distances, network examples, etc. One skilled in the relevant art will recognize, however, that many variations are possible without one or more of the specific details, or with other methods, components, layouts, measurements, etc. In other instances, well-known structures, materials, or operations are not shown or described in detail but are considered well within the scope of the disclosure.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The invention presents a rock guard that can be mounted to a trailer, and that can be selectively positioned between the trailer and the vehicle, to resist rocks and other road debris from striking the trailer, and/or the trailer's contents. The rock guard can be adapted for different types of trailers and can be mounted to existing trailer structure. In one aspect, the rock guard can be configured for use with a boat trailer to protect a boat thereon. The rock guard can be retractable to allow maintenance of the trailer or its contents. For example, the rock guard can comprise a sheet of mesh that can be selectively wound on a spool, Thus, the sheet can be selectively deployed in front of the trailer or its contents, and selectively retracted on the spool. With respect to a boat, the sheet can be retracted to allow access to the bow of the boat for wipe-down after the boat is retrieved from the water. Thus, the rock guard can have a low profile when retracted. When deployed, the sheet of mesh can be withdrawn from the spool and stretched taut in front of the bow of the boat. The distal free end of the sheet can be secured to the boat, such as with snaps on the rub rail. In addition, a top distal edge of the sheet can be flexible and can form an arc to conform to the gunwale of the boat in the deployed configuration.

Referring to FIGS. 1-4, a rock guard 10 in an exemplary embodiment is shown for use with a boat 14 and a boat trailer 18 by way of example. The rock guard 10 can be part of a rock guard system 22 with a pair of rock guards including a port guard on a port side of the boat 14 and trailer 18, and a starboard guard on a starboard side of the boat 14 and trailer 18. Thus, the pair of rock guards 10 can be mounted to the boat trailer 18 with one on each side of the trailer 18 and the boat 14 and with a gap therebetween for the winch and related trailer support. The system 22 can further comprise a bow nose piece 34 extending between the pair of rock guards 10. The rock guard 10 can be used with other types of trailers and/or trailer contents, such as carhaulers with vehicles thereon, flat bed trailers with ATVs, etc.

The rock guard 10 can be mounted to the trailer 18, such as on the side rail 38 of the boat trailer 18. The rock guard 10 can comprise a pair of brackets 42 mounted to the trailer 18, such as the rail 38 of the boat trailer 18. The brackets 42 can be spaced-apart from one another. The brackets 42 can including a fore bracket mounted closer to a front or a hitch of the trailer 18, and an aft bracket mounted closer to wheels or the axle of the trailer 18.

Figure 8:
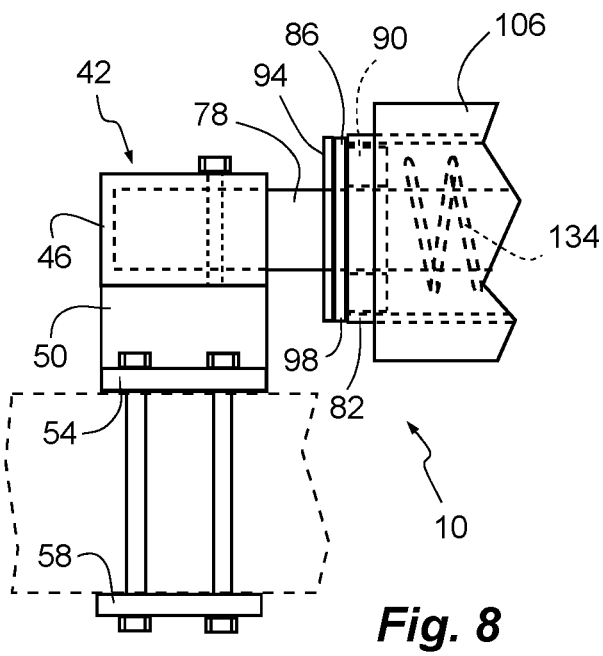
FIG. 8 is a is a partial detailed side view of the rock guard of FIG. 1 shown in the retracted configuration and showing another bracket.
Figure 9:
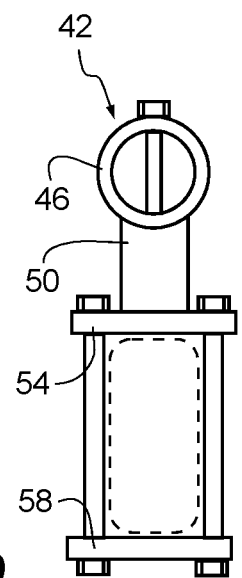
FIG. 9 is a partial end view of the rock guard of FIG. 1 showing another bracket and the inner tube, and with the outer tube and the sheet removed.

Referring to FIGS. 8 and 9, in one aspect, the brackets 42 can comprise a clevis bracket with a collar 46 or cup with a bore, a neck or riser 50 carrying the collar 46 above the rail 38, and a top plate 54 carried by a top of the rail 38 of the trailer 18. A bottom plate 58 can be opposite the top plate 54 and the plates 54 and 58 can be bolted together with the rail 38 therebetween. The bore of the collar 46 can be aligned with the rail 38 and elevated above the rail 38 by the neck 50. Thus, the brackets 42 and the rock guard 10 can be used with different styles and structural configurations of trailers. The brackets 42 can be adapted for the style or type of trailer. In addition, the brackets 42, and thus the rock guard 10, can be selectively positioned with respect to the trailer 18 or its contents, such as the boat 14.

Figure 5:
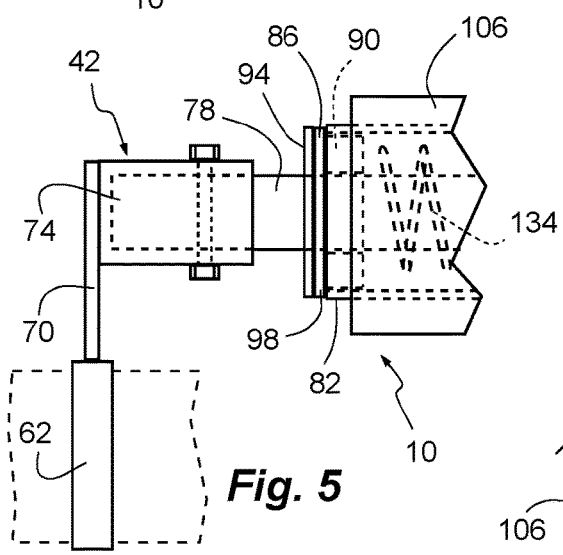
FIG. 5 is a partial detailed side view of the rock guard of FIG. 1 shown in the retracted configuration.
Figure 6:
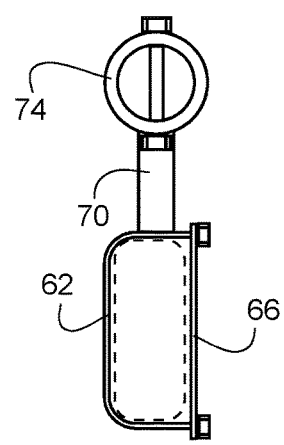
FIG. 6 is a partial end view of the rock guard of FIG. 1 showing a bracket and an inner tube, and with an outer tube and a sheet removed.

Referring to FIGS. 5 and 6, in another aspect, the brackets can comprise a shackle bracket with a square U-bolt 62 on top and bottom of the rail 38. A plate 66 with a pair of holes can receive the threaded ends of the U-bolt 62. The U-bolt 62 can be positioned on the rail 38, and the plate 66 can close the U-bolt 62 with the rail 38 therein and secured by lock nuts. The brackets can have an elevated riser or neck 70 extending from the U-bolt 62 to an elevated position above the rail 38 of the trailer 18. The bracket can also have a receiver, such as a cup or collar 74, carried by the elevated riser 70. The receivers or cups 74 can face one another. The terms cup and collar are used interchangeably herein. The terms riser and neck are used interchangeably herein.

Figure 7:
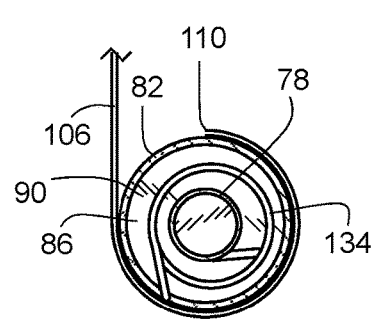
FIG. 7 is a partial cross-sectional end view of the rock guard of FIG. 1 shown in the deployed configuration and shown with the bracket removed.

Referring to FIGS. 5, 7 and 8, the rock guard 10 can comprise an axle such as an inner tube 78 affixed to and extending between the pair of mounting brackets 42. The opposite ends of the inner tube 78 can be retained in the bores of the collars 46 or cups 74 of the brackets 42. The inner tube 78 can be fixed to the brackets 42 and prevented from rotation, such as with a set screw or bolt. In one aspect, the inner tube 78 can be a 1" metal tube. The inner tube 78 is elevated above and spaced-apart from the rail 38 by the neck 50 or the riser 70.

In addition, the rock guard 10 can comprise an outer tube 82 carried by the inner tube 78, with the inner tube 78 extending through the outer tube 82. The outer tube 82 can rotate on and with respect to the inner tube 78 and the pair of brackets 42, and thus the trailer 18. The outer tube 78 can define a spool. In one aspect, the outer tube 82 can comprise 2" metal tubing. The inner tube 78 can be longer than the outer tube 82 so that the opposite ends of the inner tube 78 extend beyond the outer tube 82 and into the collars 46 or the cups 74 of the brackets 42.

A pair of bushings 86 can be positioned between the inner and outer tubes 78 and 82, such as at opposite ends of the outer tube 82. The bushings 86 can be plastic or Rulon® and can allow the outer tube 82 to rotate on the bushing 86. Thus, the bushings 86 can have a shoulder 90 between the outer tube 82 and the inner tube 78 to carry the outer tube 82, and to space the outer tube 82 from the inner tube 78. In one aspect, the shoulder 90 can be annular and can form an annulus.

A pair of washers 94 can be carried by the inner tube 78 and can close open ends of the outer tube 82. In addition, each bushing 86 can have an annular flange 98 extending radially from the shoulder 90 or annulus thereof and positioned between the end of the outer tube 82 and the washer 94. The washers 94 and flanges 98 of the bushings 86 can be held against the outer tube 82 by set screws or cottar pins.

The outer tube 82 and the spool can be positioned adjacent to the rail 38 of the boat trailer 18, and closer to a keel of the boat 14 than to a gunwale 102 of the boat 14. Thus, the rock guard 10 can maintain accessibility to the boat 14 for maintenance, such as wipe-downs.

The rock guard 10 can also comprise a sheet 106 carried by the outer tube 82 and the spool. In one aspect, the sheet 106 can be a polyvinyl chloride (PVC) mesh. The mesh can have a matrix of small openings to reduce surface area, and thus wind resistance force against the sheet while the trailer 18 is being towed by the vehicle. In addition, the mesh can resist retaining water when the rock guard 10 is submerged with the trailer 18 during launch and retrieval of the boat 14. In addition, the sheet 106 can comprise a web or webbing 108 around a perimeter thereof and enclosing the mesh. In one aspect, the webbing 108 can extend around at least perimeter lateral sides and the top distal edge 114 of the sheet 106.

A bottom proximal edge 110 (FIG. 7) of the sheet 106 can be coupled to the outer tube 82 and the spool, such as with hook-and-loop type fasteners. An opposite, top distal edge 114 (FIG. 4) of the sheet 106 can be coupled to the trailer or its contents, such as the boat 14. In addition, one or more loops or straps 118 can be secured to and can extend from the sheet 106 adjacent the top distal edge 114, defining hand grips or retaining straps. In one aspect, the strap 118 can extend around the sheet 106 in the retracted position to retain the sheet 106 in the retracted position. In another aspect, the strap 118 can secure to a corresponding strap carried by the rail 38 of the trailer 18, such as with a buckle.

A protective strip 122 of soft and pliant material, such as felt, can be positioned along the top distal edge 114 of the sheet 106 to bear against the trailer or its contents, such as the gunwale 102 or a rub rail 126 of the boat 14, to resist damage to the contents or the boat 14. The protective strip 122 can be located on an inside surface of the sheet 106. The protective strip 122 can extend down from the top distal edge 114 of the sheet 106 to an intermediate distance along the height of the sheet. In one aspect, the protective strip 122 can be substantially solid, unlike the mesh.

The sheet 106 can have at least two configurations, including a retracted configuration and a deployed configuration. In the retracted configuration, the sheet 106 is wound around the outer tube 82 and the spool and the top distal edge 114 of the sheet 106 is adjacent the outer tube 82 and the spool. Thus, in the retracted configuration, the rock guard 10 and the sheet 106 is located adjacent the rail 38 of the trailer 18 to allow access to the boat 14. In the deployed configuration, the sheet 106 is unwound and extended from the outer tube 82 and the spool, with the top distal edge 114 secured to the gunwale 102 and/or the rub rail 126 of the boat 14, and an intermediate portion of the sheet 106 extends between the outer tube 82 and the spool and the gunwale 102 and/or the rub rail 126.

A fastener 130 can be coupled to and between the top distal edge 114 of the sheet 106 and the gunwale 102 and/or the rub rail 126 of the boat 14 to selectively maintain the sheet 106 in the deployed configuration. In one aspect, the fastener 130 can be an array of snap fasteners. One portion of the snap fastener can be secured to the top distal edge 114 of the sheet 106 while the other portion of the snap fastener can be secured to the rub rail 126.

A spring 134, such as a torsion spring, can coupled to and between the inner and outer tubes 78 and 82. The spring 134 can tension the sheet 106 taut in the deployed configuration, and can wind the sheet 106 around the outer tube 82 and the spool in the retracted configuration. One end of the spring 134 can be attached to the inner tube 78, while the other end of the spring 134 can be coupled to the outer tube 82.

The top distal edge 114 of the sheet 106 can be flexible and conformable to a profile of the gunwale 102 and/or the rub rail 126 of the boat 14. In the deployed configuration of the sheet 106, the top distal edge 114 of the sheet 106 can have an arcuate configuration (as shown in FIG. 1, and as shown in dashed lines in FIG. 4) in which the tope distal edge 114 is arcuate and forms an arc away from the outer tube 82 and the spool, while the bottom proximal edge 110 of the sheet 106 is linear and straight. The tope distal edge 114 of the sheet 106 can also have a straight configuration (as shown in solid likes in FIG. 4). In the retracted configuration of the sheet 106, the top distal edge 114 of the sheet 106 can also have a straight configuration in which the top distal edge 114 is positioned along the outer tube 82 and the spool.

In use, a user can grasp the straps 118 and/or the top distal edge 114 of the sheet 106 and withdraw the sheet 106 from the outer tube 82 and the spool against the force of the spring 134 until the top distal edge 114 reaches the gunwale 102 and/or the tub rail 126 of the boat 14. The user can then snap the fasteners 130 together to secure the top distal edge 114 of the sheet 106 to the gunwale 102 and/or rub rail 126, with the spring 134 holding the sheet 106 taught. The boat 14 and trailer 18 can then be transported with the sheet 106 and the rock guard 10 protecting the boat bow and hull. In addition, the fasteners 130 can be undone and the sheet 106 can be retracted around the outer tube 82 and the spool under the force of the spring 134 to allow the user access to the boat bow or hull, such as for a wipe-down. The strap 118 can be secured to a corresponding strap on the rail 38 of the trailer 18.

Figure 10:
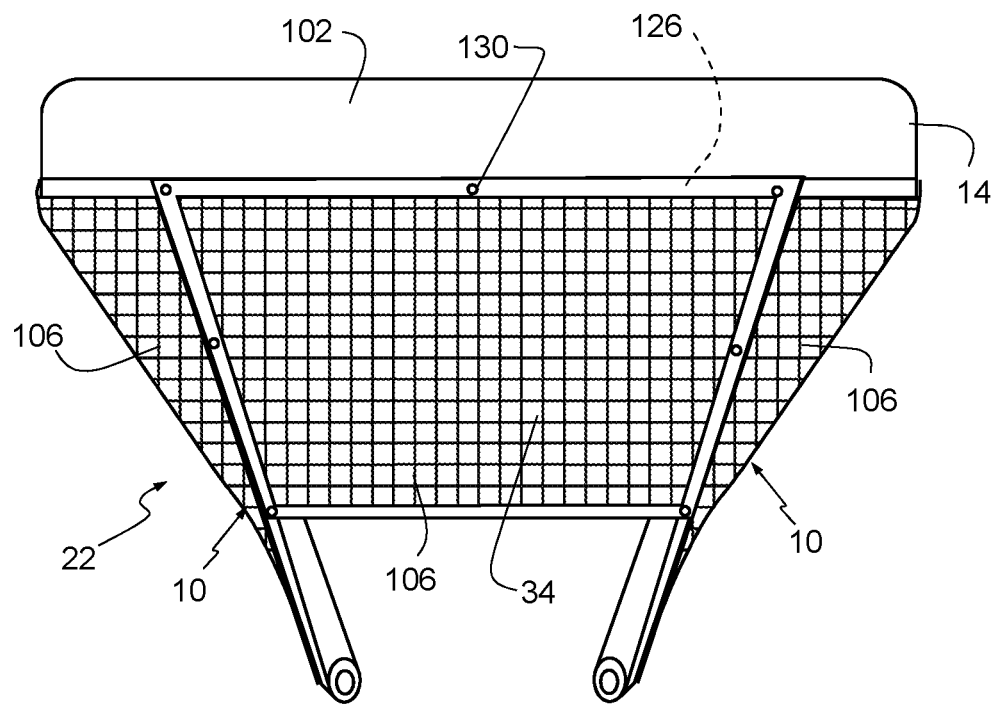
FIG. 10 is a partial schematic end view of the rock guard system of FIG. 1.

Referring to FIG. 10 and as described above, a rock guard 10 can be positioned on both sides of the trailer 18 and the 14 boat with a port guard on a port side of the boat 14 and a starboard guard on a starboard side of the boat 14. In addition, a bow nose piece 34 can be releasably coupled to and can extend between a pair of sheets 106 associated with a pair of rock guards 10. The bow nose piece 34 can be a sheet of mesh similar to, or the same as, the sheets 106. Fasteners can be coupled to the sheets and the bow nose piece 34, such as to the perimeter webbing thereof. The fasteners can be snaps. The bow nose piece 34 can be resleasably coupled to one or both of the rock guards 10 and the sheets 106 thereof. In one aspect, the bow nose piece 34 can be carried by one of the rock guards 10 and wound about the spool thereof in the retracted configuration. The bow nose piece 34 can be positioned at a front of the bow, and can be coupled to the bow, such as the gunwale 102 and/or the rub rail 126, with fasteners such as snaps.

In one aspect, the sheet 106 can have a trailing edge further from a bow of the boat and a leading edge closer to the bow of the boat. In one aspect, the sheet can be rectangular or square with parallel leading and trailed edges. In another aspect, the sheet can be shaped as a trapezoid with the leading edge at an acute angle with respect to the trailing edge, and with the top distal edge being longer than the bottom proximal edge. Thus, the sheet can more closely approximate the shape of the bow or hull.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. At least one rock guard in combination with a boat and a boat trader, the rock guard comprising:
   a) a pair of brackets mounted to a rail of the boat trailer and spaced-apart from one another including a fore bracket mounted closer to a hitch of the trader and an aft bracket mounted closer to a wheel of the trailer;
   b) an inner tube affixed to and extending between the pair of mounting brackets;
   c) an outer tube carried by the inner tube with the inner tube extending through the outer tube, and the outer tube being rotatable with respect to the inner tube and the pair of brackets, defining a spool;
   d) a sheet carried by the spool and having a bottom proximal edge coupled to the spool and an opposite, a top distal edge, the sheet having at least two configurations, including:
      i) a retracted configuration in which the sheet is wound around the spool; and
      ii) a deployed configuration in which the top distal edge is secured to the boat, and an intermediate portion of the sheet extends between the spool and the boat; and
   e) a fastener coupled to and between the top distal edge of the sheet and the boat to selectively maintain the sheet in the deployed configuration.

2. The combination in accordance with claim 1, further comprising:
   a spring coupled to and between the inner and outer tubes to tension the sheet taut in the deployed configuration, and to wind the sheet around the spool in the retracted configuration.

3. The combination in accordance with claim 1, further comprising:
   a strip of felt along the top distal edge of the sheet to bear against the boat in the deployed configuration.

4. The combination in accordance with claim 1, wherein the sheet comprises a mesh.

5. The combination in accordance with claim 4, wherein the sheet further comprises:
   a webbing extending around at least perimeter lateral sides and the top distal edge of the sheet.

6. The combination in accordance with claim 1, further comprising:
   a strap secured to and extending from the sheet adjacent the top distal edge.

7. The combination in accordance with claim 1, wherein the fastener comprises an array of snap fasteners.

8. The combination in accordance with claim 1, wherein the top distal edge of the sheet is flexible and conformable to a profile of the boat.

9. The combination in accordance with claim 1, wherein the top distal edge of the sheet is arcuate in the deployed configuration while the bottom proximal edge of the sheet is linear.

10. The combination in accordance with claim 1, further comprising:
    a pair of bushings between the inner and outer tubes, the bushings having a shoulder to carry the outer tube.

11. The combination in accordance with claim 10, further comprising:
    a pair of washers carried by the inner tube and closing the open ends of the outer tube; and
    the pair of bushings having a flange between ends of the outer tube and the washer.

12. The combination in accordance with claim 1, further comprising:
    the at least one rock guard comprising a pair of rock guards including a port guard on a port side of the boat and a starboard guard on a starboard side of the boat; and
    a bow nose piece extending between the port and starboard guards.

13. A boat rock guard configured for use with a boat and a boat trailer, the boat rock guard comprising::
    a) a pair of brackets configured to be mounted to a rail of trailer and spaced-apart from one another;
    b) a spool carried between the pair of brackets and rotatable with respect to the pair of brackets;
    c) a sheet of carried by the spool and having a bottom proximal edge coupled to the spool and an opposite, a top distal edge, the sheet having at least two configurations, including:
        i) a retracted configuration in which the sheet is wound around the spool; and
        ii) a deployed configuration in which the sheet is unwound from the spool; and
    d) the top distal edge of the sheet being flexible and haying at least two configurations, including:
        i) a straight configuration in which the top distal edge is positioned along the spool and corresponding to the retracted configuration of the sheet; and
        ii) an arcuate configuration in which the top distal edge forms an arc away from the spool and corresponding to the deployed configuration of the sheet.

14. The boat rock guard in accordance with claim 13, further comprising:
    a fastener coupled to the top distal edge of the sheet to selectively maintain the sheet in the deployed configuration.

15. The boat rock guard in accordance with claim 14, wherein the fastener comprises an array of snap fasteners.

16. The boat rock guard in accordance with claim 13, wherein the sheet further comprises:
    a mesh; and
    a webbing extending around at least perimeter lateral sides and the top distal edge of the sheet.

17. The boat rock guard in accordance with claim 13, further comprising:
    a strip of felt along the top distal edge of the sheet.

18. The boat rock guard in accordance with claim 13, further comprising:
    a strap secured to and extending from the sheet adjacent the top distal edge.

19. A pair of boat rock guards in accordance with claim 13, including a port guard configured for a port side of the boat and a starboard guard configured for a starboard side of the boat, and further comprising:
    a bow nose piece extending between the port and starboard guards.

20. A boat rock guard system configured for use with a boat and a boat trailer, the boat rock guard system comprising:
    a) a pair of boat rock guards including a port guard configured for a port side of the boat and a starboard guard configured for a starboard side of the boat, each boat rock guard comprising:
        i) a pair of brackets configured to be mounted to a rail of trader and spaced-apart from one another;
        ii) a spool carried between the pair of brackets and rotatable with respect to the pair of brackets;
        iii) a sheet of mesh carried by the spool and having a bottom proximal edge coupled to the spool and an opposite, a top distal edge, the sheet having at least two configurations, including:
            A) a retracted configuration in which the sheet is wound around the spool; and
            B) a deployed configuration in which the sheet is unwound from the spool and configured to be attached to the boat; and
    b) a bow nose piece extending between the port and starboard guards.

\* \* \* \* \*